United States Patent [19]
Yang

[11] Patent Number: 5,352,105
[45] Date of Patent: Oct. 4, 1994

[54] EVA SOLE MOLDING DIE ASSEMBLY

[76] Inventor: Kuo-Nan Yang, No. 92, Lane 52, Fu Te Rd., Ta Li, Taichung Hsien, Taiwan

[21] Appl. No.: 185,005

[22] Filed: Jan. 24, 1994

[51] Int. Cl.$^5$ .................... B29C 33/00; B29C 45/26
[52] U.S. Cl. ................... 425/129.2; 249/171; 249/172; 425/442; 264/328.8
[58] Field of Search ............. 249/160, 170, 171, 172; 425/588, 442, 229.2, 190; 264/328.8

[56] References Cited
U.S. PATENT DOCUMENTS 3,751,200  8/1973  Borisuck et al. ............... 425/129.2
4,372,525  2/1983  Uhlig ........................... 425/129.2
4,556,191  12/1985  Mangogna ..................... 249/171

Primary Examiner—Khanh Nguyen
Attorney, Agent, or Firm—Bacon & Thomas

[57] ABSTRACT

An EVA sole molding die assembly for molding integral EVA (ethylene vinyl acetate) soles having different color layers, the molding die assembly including a bottom die for molding the bottoms of EVA outsoles, an outsole molding die hinged to the bottom die for molding EVA outsoles, an insole molding die hinged to the outsole molding die for molding EVA insoles on EVA outsoles being molded in the outsole molding die, and a top die hinged to the insole molding die for molding EVA insoles.

2 Claims, 5 Drawing Sheets

EVA SOLE MOLDING DIE ASSEMBLY

BACKGROUND OF THE INVENTION

The present invention relates to an EVA (ethylene vinyl acetate copolymer resin) sole molding die assembly for molding colored EVA sole in integrity for rubber shoes.

Conventionally, there are three methods known and adopted for making EVA (ethylene vinyl acetate) soles. These methods include:

(A) Molding individual EVA insoles and individual rubber outsoles separately through separate molding dies, and then adhering each individual EVA insole to a respective individual rubber outsole.

(B) Directly and integrally molding an EVA sole having an EVA insole and a colored EVA outsole.

(C) Directly and integrally molding an EVA sole having an EVA insole and an EVA outsole and then paint-coating the EVA sole in assorted colors.

FIGS. 1 and 2 show an EVA sole molding die assembly for making EVA soles according to the aforesaid methods (B) and (C). The EVA sole molding die assembly is comprised of a bottom die, a top die, and an intermediate die. The intermediate die is hinged between the bottom die and the top die. This structure of EVA sole molding die assembly has limitations in making EVA soles having multiple color layers.

SUMMARY OF THE INVENTION

One object of the present invention is to provide an EVA sole molding die assembly which is practical in use for molding EVA soles in integrity. Another object of the present invention is to provide en EVA sole molding die assembly which is practical in use for molding integral EVA soles having multiple color layers.

To achieve these objects, there is provided an EVA sole molding die assembly for molding integral EVA soles having different color layers, which comprises a bottom die for molding the bottoms of EVA outsoles, an outsole molding die hinged to the bottom die for molding EVA outsoles, an insole molding die hinged to the outsole molding die for molding EVA insoles on EVA outsoles being molded in the outsole molding die, and a top die hinged to the insole molding die for molding EVA insoles.

DETAILED DESCRIPTION OF THE PREFERRED EMBODIMENT

Figure 1:
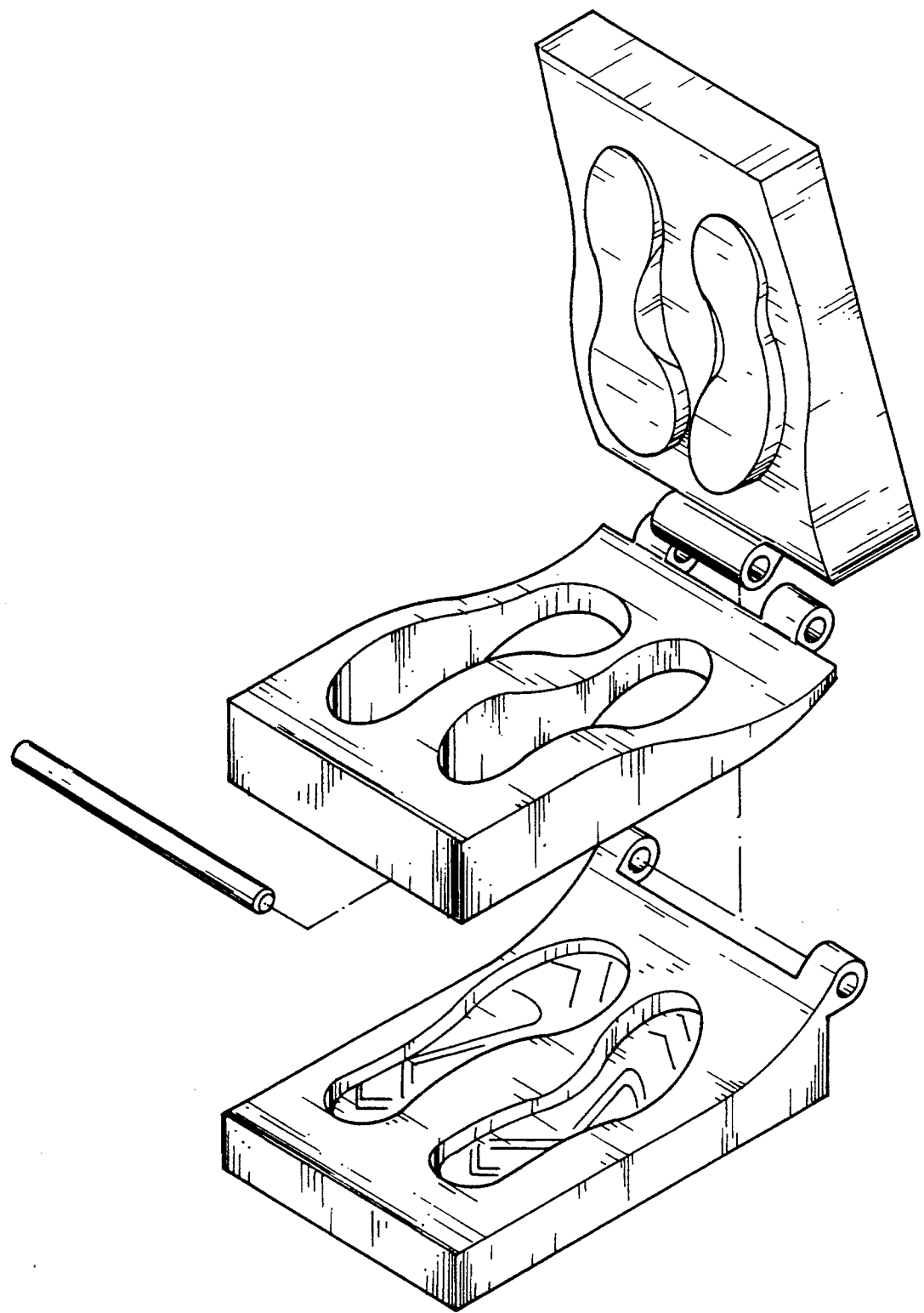
FIG. 1 is an exploded view of an EVA (ethylene vinyl acetate) outsole molding die assembly according to the prior art.
Figure 2:
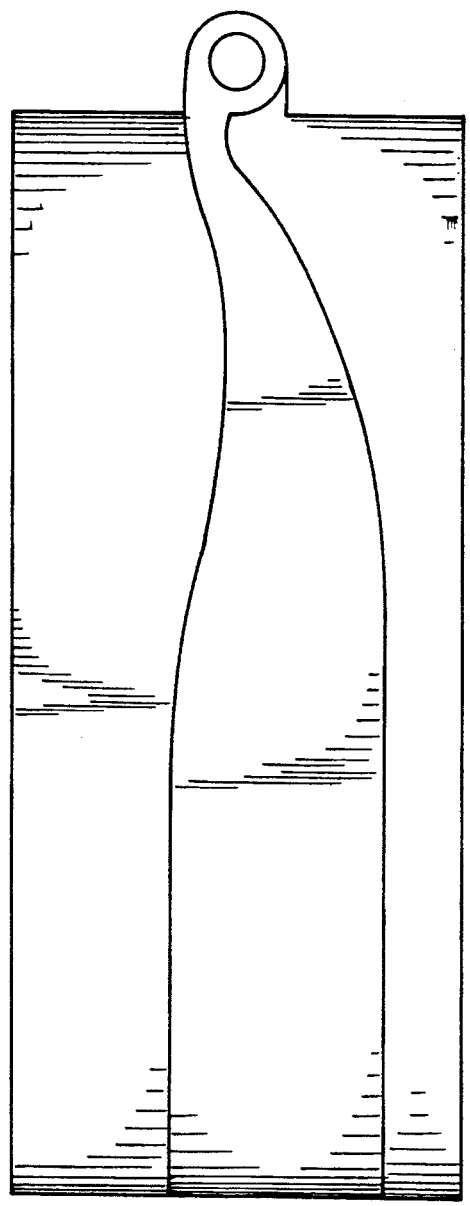
FIG. 2 shows the EVA outsole molding die assembly of FIG. 1 assembled.
Figure 3:
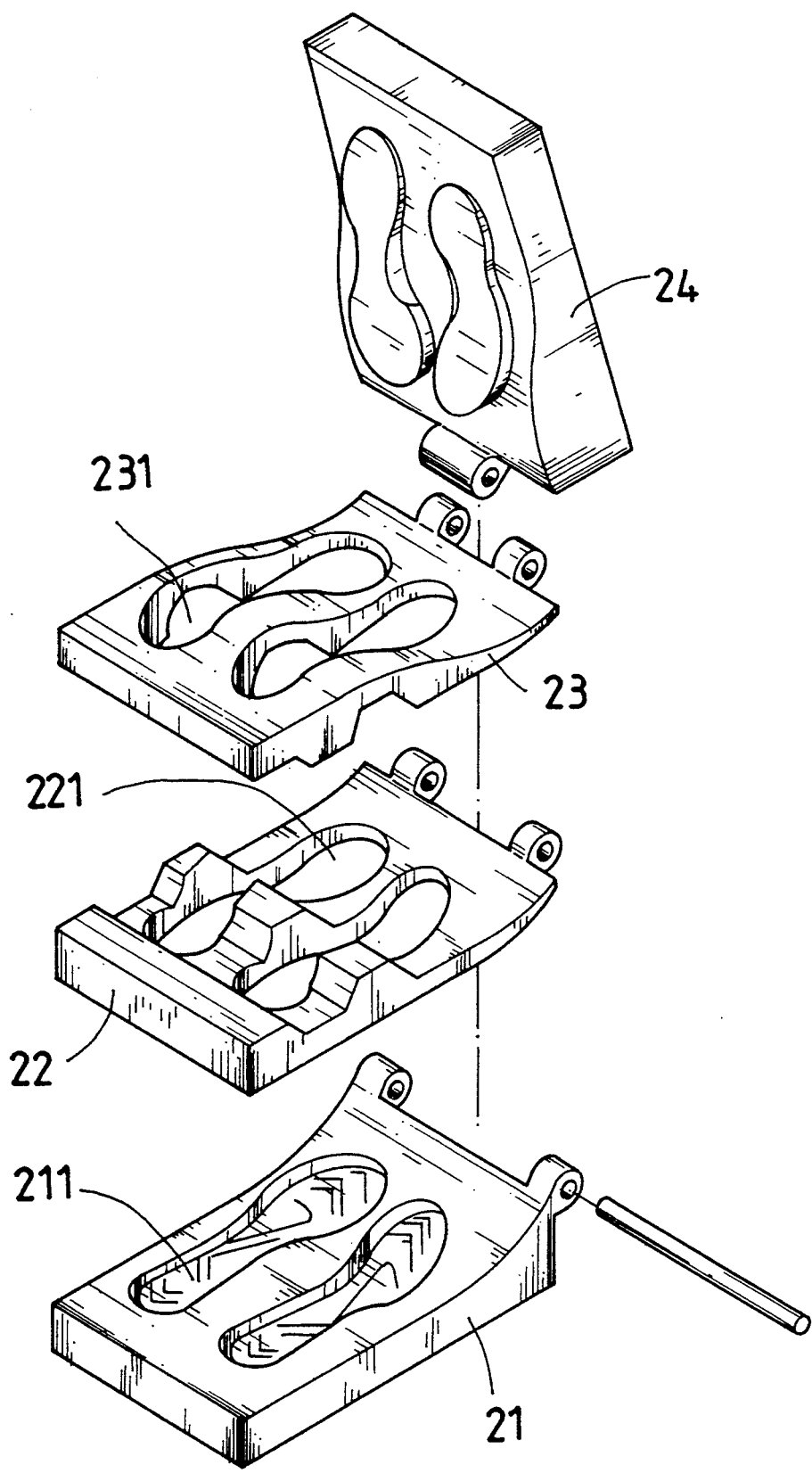
FIG. 3 is an exploded view of an EVA sole molding die assembly according to the preferred embodiment of the present invention.
Figure 4:
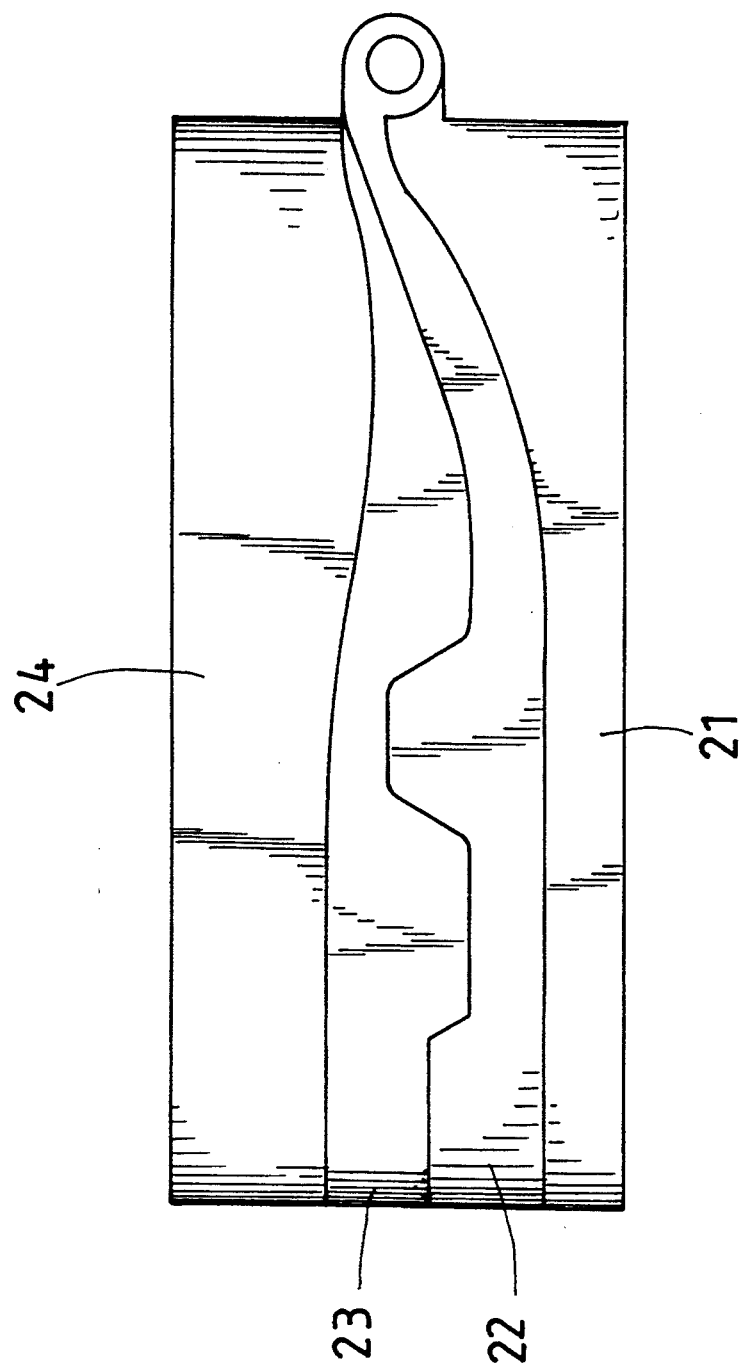
FIG. 4 shows the EVA sole molding die assembly of FIG. 3 assembled.

Referring to FIGS. 3 and 4, an EVA sole molding die assembly in accordance with the preferred embodiment of the present invention is generally comprised of a bottom die 21, a outsole molding die 22, an insole molding die 23, and a top die 24. The dies 21;22;23;24 are hinged together and arranged in a stack with one fitting over another. The bottom die 21 has a pair of die cavities with stripes 211 for molding the bottoms of EVA outsoles. The outsole molding die 22 has a pair of outsole molding slots 221 corresponding to the die cavities with stripes 211 on the bottom die 21 for molding colored outsoles. The insole molding die 23 has a pair of insole molding slots 231 corresponding to the outsole molding slots 221 on the outsole molding die 22 for molding insoles. The top die 24 has unitary lasts 241 raised from the bottom surface thereof corresponding to the insole molding slots 231 on the insole molding die 23.

Figure 5:
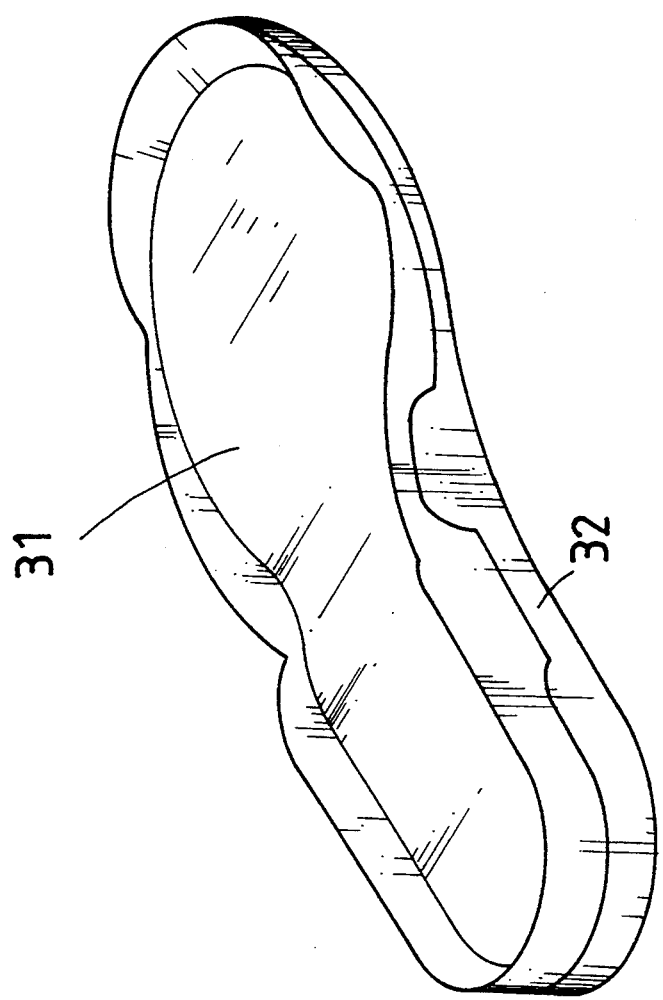
FIG. 5 shows an EVA sole made through the EVA sole molding die assembly shown in FIG. 3.

The EVA sole molding process according to the present invention is outlined hereinafter. A colored EVA outsole material and a differently colored EVA insole material are respectively put in the outsole molding die 22 and the insole molding die 23, then the top die 24 is covered on the insole molding die 23, and then the EVA molding die assembly is put in the molding machine for thermosetting. After setting, a pair of colored, integral EVA soles are made. FIG. 5 shows an integral EVA sole made according to the present invention and comprised of unitary insole 31 and outsole 32 in different colors. The shape of the outsole 32 is subject to the design of the outsole molding die 22 and the insole molding die 23. By changing the design of the outsole molding die 22, an outsole having Irregular color layers can be made.

As indicated, the present invention provides an EVA sole molding die assembly which is practical for molding an integral EVA sole having different color layers.

I claim:

1. An EVA sole molding die assembly for molding integral EVA (ethylene vinyl acetate) soles having different color layers, the molding die assembly comprising a bottom die having a pair of die cavities for molding the bottoms of EVA outsoles, an outsole molding die hinged to said bottom die and having a pair of outsole molding slots corresponding to the die cavities on said bottom die for molding EVA outsoles, an insole molding die hinged to said outsole molding die and having a pair of insole molding slots corresponding to the outsole molding slots on said outsole molding die for molding EVA insoles on EVA outsoles being molded in said outsole molding die, and a top die hinged to said insole molding die and having unitary lasts raised from a bottom surface thereof corresponding to the insole molding slots on said insole molding die for molding EVA insoles.

2. The EVA sole molding die assembly of claim 1 wherein said outsole molding die and said insole molding die are so matched that irregular color layers are shown on the EVA outsoles being molded.

* * * * *